A. SEAVER.
AEROPLANE.
APPLICATION FILED MAR. 9, 1912.
1,040,785.
Patented Oct. 8, 1912.
2 SHEETS—SHEET 1.
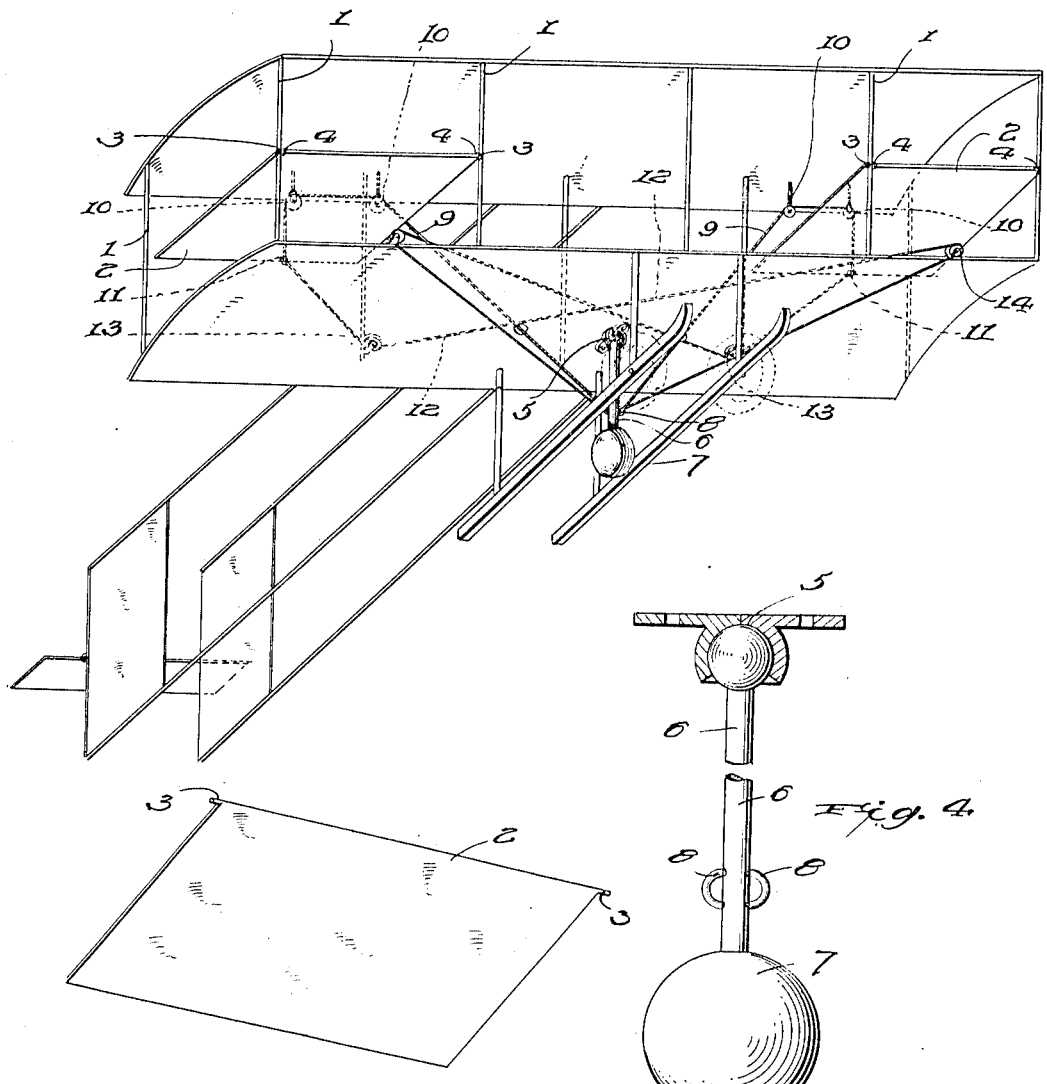
WITNESSES
INVENTOR
August Seaver
By E. E. Vrooman, Attorney.

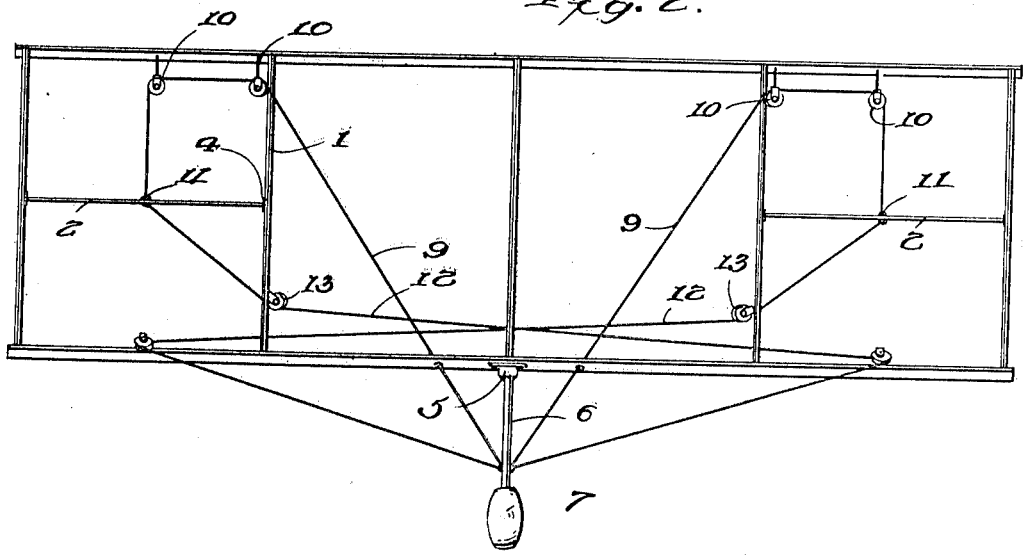
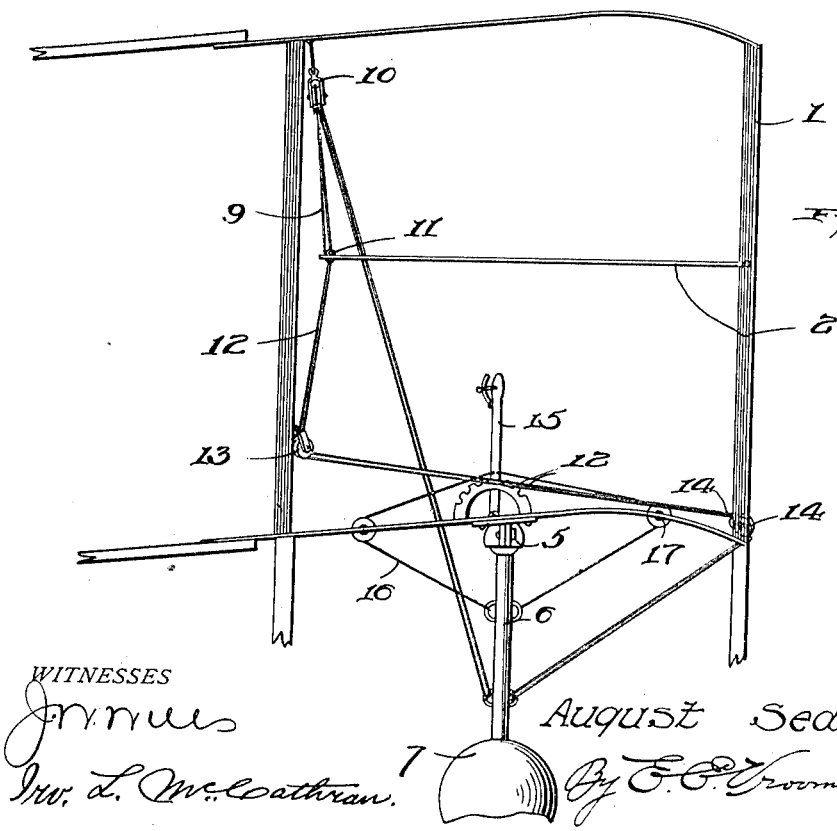

UNITED STATES PATENT OFFICE.

AUGUST SEAVER, OF MONTAGUE, MICHIGAN.

AEROPLANE.

1,040,785.  Specification of Letters Patent.  Patented Oct. 8, 1912.

Application filed March 9, 1912. Serial No. 682,570.

*To all whom it may concern:*

Be it known that I, AUGUST SEAVER, a citizen of the United States, residing at Montague, in the county of Muskegon and State of Michigan, have invented certain new and useful Improvements in Aeroplanes, of which the following is a specification, reference being had therein to the accompanying drawing.

This invention relates to airships, and has particular reference to a balancing device for a machine commonly known as the "heavier than air type."

The principal object of this invention is the production of an efficient pendulum means, whereby the balancing planes may be automatically adjusted provided the aeroplane should take a sudden endwise tip.

Another object of this invention is the production of an efficient means for suspending the pendulum in the center of the machine so as to act upon the balancing planes simultaneously.

With these and other objects in view this invention consists of certain novel constructions, combinations, and arrangements of parts, as will be hereinafter fully described and claimed.

In the drawings:—Figure 1 is a perspective view of the aeroplane looking from the bottom thereof. Fig. 2 is a front view of the plane showing the equalizing cables attached to the balancing planes. Fig. 3 is an end view of the machine. Fig. 4 is a side view of the pendulum showing the point of connection thereof. Fig. 5 is a detail perspective view of the balancing planes.

Of course, it should be understood that the present invention may be applied to either the monoplane, or any other machine of the type specified without departing from the spirit of the invention. In the drawings it will be seen, however, that the plane is preferably provided with a pair of balancing planes, one plane being positioned near each end of the machine. These planes are preferably mounted between two of the spacing bars 1, and these balancing planes 2 are provided with stub shafts 3 which fit in suitable journals 4 formed upon the posts 1. The rear ends of the planes are free to have a vertical movement, and to the rear ends of these planes are secured the equalizing cables hereinafter described.

A universal joint preferably of the ball and socket type 5 is carried by the bottom of the machine, and from this joint is suspended a pendulum 6 having a control weight 7 at its lower end. Eyes 8 are formed upon the sides of the pendulum 6 and are adapted to be engaged by the equalizing cables above mentioned. A primary equalizing cable 9 is connected to one of the eyes and passes through the bottom plane of the machine, over the supporting pulleys 10 and has its lower end connected to an eye 11 near the center of the outer edge of the balancing planes 2. There is a primary controlling cable 9 connected to the pendulum 6 for controlling each of the elevating or balancing planes 2 similar to that just described. An auxiliary controlling cable 12 is secured to the eye 11 and passes over a pulley 13 carried by the inner post 1, and this cable 12 from there passes over a pulley 14 which is carried near the opposite end of the machine. This cable 12 from there passes to the eye 8 upon the opposite side of the pendulum so that provided the pendulum should swing in one direction the rear end of the balancing plane 2 would be raised, and if swung in the other position, the rear end of the balancing plane would be lowered, thereby controlling the adjustment of the planes provided the machine should take a sudden dip.

It will be obvious that, provided the planes should take an endwise dip, the pendulum, through the force of gravity would be readily swung in the direction of the fall and cause the free ends of the balancing planes to be lowered thereby causing the planes to be acted upon by the air currents in such a manner as to have an upward pressure thereon thereby tending to bring the plane to its normal or horizontal position. Of course, as soon as the plane should come to its normal position, the pendulum will at once return to its vertical position, thereby not, in any way, interfering with the free operation of the machine.

From the foregoing description, it will be obvious that a very simple and efficient device has been produced which may be readily attached to the aeroplane of the usual type, and which will form a very efficient and durable automatic self-adjusting device for causing the plane to immediately come to its horizontal position provided the machine should strike an eddy of air currents which might cause the machine to dip.

It should, of course, be understood that provided the machine should take a forward dip, the pendulum 7 will swing to such a position as to cause the rear end of the balancing planes to be raised up which would give the machine an upward movement and thereby prevent the falling of the machine. There has thus been provided a balancing device which will prevent the machine from dipping endwise as well as falling directly forward.

In order to control the weight 7 when descending or ascending in the machine, a lever 15 is provided which is connected to the weight by means of cables 16. These cables engage the eyes 8 of the rod 6 and pass over the pulleys 17 carried by the lower plane. Of course, the lever is so constructed as to allow the same to automatically swing with the weight, when not ascending or descending.

What is claimed is:—

1. In a flying machine, supporting planes positioned in vertical spaced relation, balancing planes pivotally mounted between said supporting planes, a plate mounted in the center of the lower face of the lower one of said supporting planes, a socket carried by said plate, a pendulum having its upper end formed into a ball mounted in said socket, oppositely disposed eyes carried by said pendulum adjacent its lower end, a cable secured to one of said eyes and carried over a pulley at one side of said lower supporting planes, and carried to the opposite side of said flying machine and connected to the lower face of one of said balancing planes, a second cable secured to the second eye and carried over pulleys carried by the upper one of said supporting planes above said balancing plane and connected with the upper face of said balancing plane, a third cable connected with said first mentioned eye and carried over pulleys carried by said upper supporting plane above the remaining one of said balancing planes and connected with the upper face of said second balancing plane, and a fourth cable secured to said second mentioned eye and carried over a pulley carried by the lower supporting plane beneath said first mentioned balancing plane and being then carried across the flying machine and having its end portion connected with the lower face of said second mentioned balancing plane.

2. A flying machine comprising a pair of supporting planes positioned one above the other in spaced relation, a pendulum connected with the lower supporting plane to permit of universal movement, balancing planes pivotally mounted between the end portions of said supporting planes, cables leading from said pendulum to said balancing planes whereby said balancing planes will move in opposite directions upon the swinging of said pendulum longitudinally of said supporting planes, a lever carried by the lower one of said supporting planes, pulley wheels mounted in said lower plane, and cables connected with said lever and leading over said pulley wheels and having their lower ends connected with oppositely disposed eyes carried by said pendulum whereby the movement of said lever will swing said pendulum transversely of said supporting planes.

In testimony whereof I hereunto affix my signature in presence of two witnesses.

AUGUST SEAVER.

Witnesses:
WELLS CHAPMAN,
J. W. BAKER.